United States Patent [19]

Shin et al.

[11] Patent Number: 4,778,298
[45] Date of Patent: Oct. 18, 1988

[54] CLEANING DEVICE HAVING A SPRAY NOZZLE

[76] Inventors: Byung Kwan Shin; Kwan Hong Shin, both of 2-57 2-Ka Hankang-Ro, Young San-Ku, Seoul, Rep. of Korea

[21] Appl. No.: 65,430

[22] Filed: Jun. 23, 1987

[30] Foreign Application Priority Data

May 13, 1987 [KR] Rep. of Korea .................. 87-7243

[51] Int. Cl.⁴ .............................................. A47L 1/08
[52] U.S. Cl. ...................................... 401/27; 401/137; 401/139; 401/146; 401/188 R
[58] Field of Search ............... 401/143, 146, 188 R, 401/149, 27, 26, 25, 22, 23, 139, 137

[56] References Cited

U.S. PATENT DOCUMENTS

| | | | |
|---|---|---|---|
| 66,249 | 7/1867 | Palmer | 401/146 X |
| 176,044 | 4/1876 | Parks | 401/146 |
| 957,566 | 5/1910 | Knickerbocker | 401/146 X |
| 1,373,369 | 3/1921 | Trial | 401/137 |
| 2,746,071 | 5/1956 | Charun | 401/22 X |
| 3,024,487 | 3/1962 | Jones et al. | 401/137 X |
| 3,809,484 | 5/1974 | Bradshaw | 401/188 X |

FOREIGN PATENT DOCUMENTS

| | | | |
|---|---|---|---|
| 2408487 | 6/1979 | France | 401/27 |
| 854652 | 11/1960 | United Kingdom | 401/23 |

*Primary Examiner*—Steven A. Bratlie
*Attorney, Agent, or Firm*—Birch, Stewart, Kolasch & Birch

[57] ABSTRACT

A cleaning device for use in cleaning a floor, windshield, window, or signboard which comprises a sponge scrubber, a rubber blade, a spray nozzle and a corrugated hand pump whereby the cleaning device can be utilized to scrub, wipe and spray simultaneously when the cleaning device is utilized by the user.

1 Claim, 1 Drawing Sheet

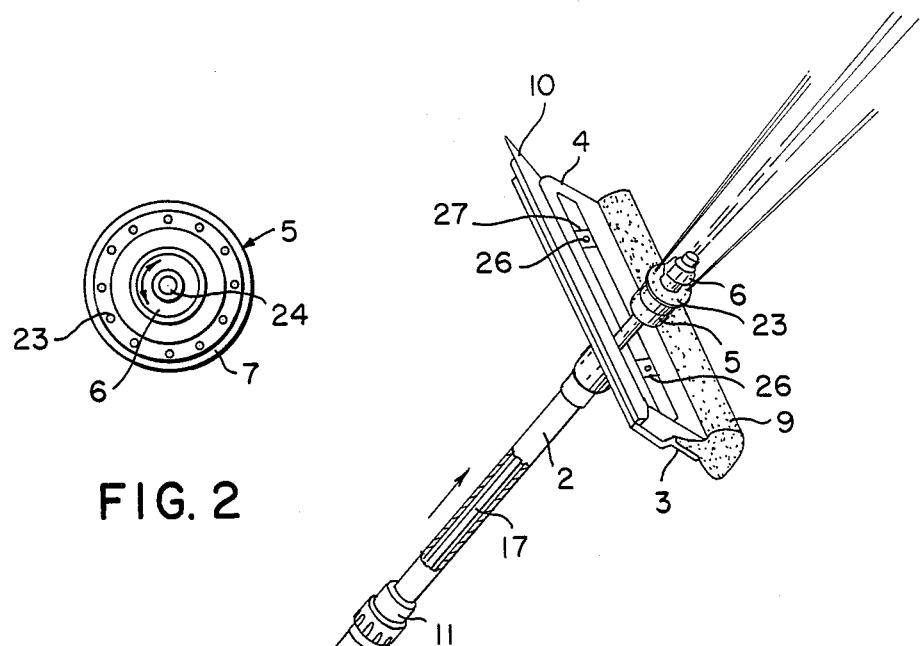
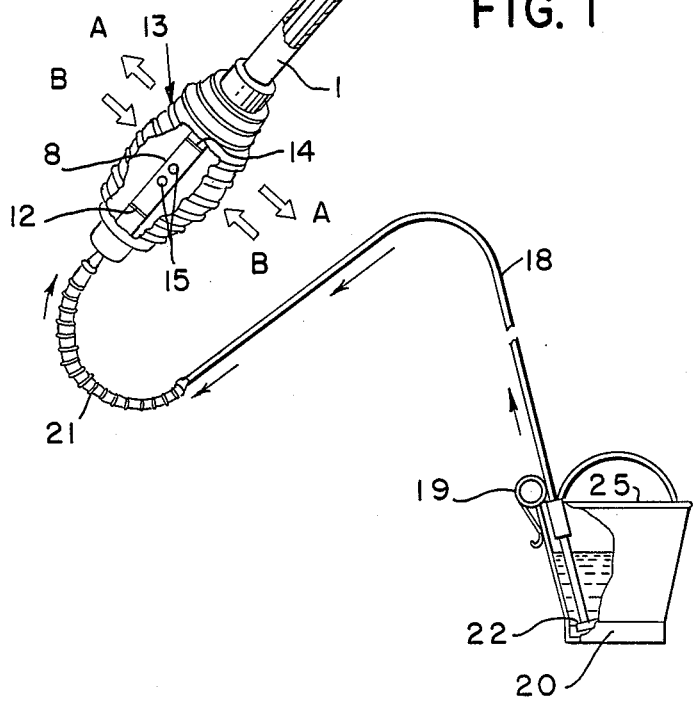
FIG. 2
FIG. 1

CLEANING DEVICE HAVING A SPRAY NOZZLE

BACKGROUND OF THE INVENTION

The present invention relates to a cleaning device having a spray nozzle and more particularly, to a cleaning device having the triple function of spraying, scrubbing and wiping a floor, window, windshield, or the like.

There are many types of cleaning devices which are well known in art comprising individual spraying devices or individual scrubbing and wiping devices. And there are cleaning devices including a sponge scrubber and a rubber blade which contain a spray disposed in a handle thereof for supplying moisture to the sponge. However, these cleaning devices suffer from a number of difficulties such as, for example, since the wiping device and spraying device are separated, it is required to clean twice, that is, first wipe the surface and then spray the surface. This requires a long cleaning time and the expense of purchasing separate wiping and spraying devices for cleaning a floor, a window, a windshield, or the like.

OBJECTS AND SUMMARY OF THE INVENTION

Accordingly, an object of the present invention is to provide an improved cleaning device having the triple function, that is, spraying, scrubbing and wiping for cleaning the floor, window, windshield or the like.

Another object of the present invention is to provide a cleaning device which is structured with a spray nozzle attached to an outside plate of the scrubbing and wiping device.

A further object of the present invention is to provide a cleaning device which contains a corrugated hand pump disposed in a handle member for supplying water from a water supply tank to a spray nozzle.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention relates to an improved cleaning device for use in cleaning a floor, window, windshield, signboard which comprises a rubber blade, a sponge scrubber, a spray nozzle and a hand pump whereby the cleaning device can be utilized to scrub, wipe and spray simultaneously when the cleaning device is utilized by the user.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a perspective view of the cleaning device of the present invention, showing in a cut away portion thereof the valves disposed in the corrugated hand pump and the water supply tank, and;

FIG. 2 is a cross-sectional view of the spray nozzle of the cleaning device of the present invention.

DETAILED DESCRIPTION OF THE INVENTION

Referring now in detail to the drawings for the purpose of illustrating the present invention, the cleaning device having a spray nozzle as shown in FIGS. 1 and 2 comprises a sponge scrubber 9, a rubber blade 10, an outside plate 4 and an inside plate 3 between which the sponge scrubber 9 is disposed and a rubber blade 10 also disposed between the inside and outside plates 3 and 4 on the opposite side from the sponge scrubber 9 and fixed thereto by bolts 26 and nuts 27. A spray nozzle 5 extends through the outside plate, and a handle member 1 including a corrugated hand pump 13 extends in the opposite direction from the spray nozzle.

The spray nozzle 5 connects to a tubular rod 2 which connects to the handle member 1 through an intermediate connector 11. An upper pipe 17 connects with the spray nozzle 5 which contains a plurality of apertures 23 and a central aperture 24 disposed at one end thereof. In the opposite direction, the upper pipe 17 connects with a lower pipe 16 disposed within the handle member 1 at the other end thereof. The spray nozzle 5 includes the central aperture 24 associated with an aperture adjusting member 6 for controlling the size of the spray and the plurality of apertures 23 are associated with a nozzle adjusting member 7 for controlling the size of its spray.

The corrugated hand pump 13 contains a hose member 8 including a first check valve 12, a plurality of apertures 15, and a second check valve 14 for introducing and sequentially discharging water from the water supply tank 20 to the spray nozzle 5 while the user is squeezing the corrugated hand pump 13. That is, when the corrugated hand pump 13 is squeezed by the hand of the user in the direction indicated by arrows (B) as shown in FIG. 1, since the first check valve 12 is opened and simultaneously, the second check valve 14 is opened, the water in the corrugated hand pump 13 is discharged from the corrugated hand pump 13 to the upper pipe 16 through the plurality of apertures 15. At this time, the corrugated hand pump 13 is operative in a vacuum position. In turn, when the corrugated hand pump 13 is released by the hand of the user in the direction indicated by arrows (A) as shown in FIG. 1, since the first check valve 12 is opened and simultaneously, the second check valve 14 is closed, the water in a hose 18 is introduced into the corrugated hand pump 13 through the plurality of apertures 15. At this time, the corrugated hand pump 13 is filled with water.

The hose 18 is connected to the corrugated hand pump 13 at one end thereof through a corrugated hose 21 and to a lid 25 of the water supply tank 20 through an engaging member 19 at the other end thereof for attaching the other end of the hose 18 to the bottom #22 of the water supply tank 20.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is

1. A cleaning device for use in cleaning windows, vehicle windshields or signboards which comprises:
  a handle member containing a corrugated hand pump at one end thereof and a spray nozzle at the other end thereof, said corrugated hand pump containing a first check valve, a plurality of apertures and a second check valve disposed therein for easily introducing and discharging water thereinto and therefrom, and said spray nozzle including a central aperture and a plurality of peripherally disposed apertures and rotating adjusting members associated with the central aperture and the peripheral apertures for controlling the size of the nozzle spray, a sponge scrubber and a rubber blade disposed behind the spray nozzle and fixed to said handle member, said sponge scrubber and said rubber blade being disposed between an outside plate and an inside plate for fixing the sponge scrubber and the rubber blade together on opposite sides of said handle member, and hose means for connecting the corrugated hand pump to a water supply means, said water supply means being provided with an engaging member for attaching one end of the hose means thereto whereby, upon the squeezing of the corrugated hand pump, the water is drawn into the corrugated hand pump and then transferred from the corrugated hand pump to the spray nozzle for distribution to the surface to be cleaned.

* * * * *